(12) United States Patent
Milligan et al.

(10) Patent No.: US 7,523,558 B2
(45) Date of Patent: Apr. 28, 2009

(54) TOOL INCORPORATING A LIGHT LINE GENERATING DEVICE

(75) Inventors: Michael A. Milligan, Gananoque (CA); Ted Andrew Kimball, Oxford Station (CA); James D. Marshall, Gananoque (CA); Oleksiy P. Sergyeyenko, Brockville (CA); Robert J. B. Hobden, Kingston (CA)

(73) Assignee: Black and Decker, Newark, DE (US)

( * ) Notice: Subject to any disclaimer, the term of this patent is extended or adjusted under 35 U.S.C. 154(b) by 58 days.

(21) Appl. No.: 11/746,206

(22) Filed: May 9, 2007

(65) Prior Publication Data

US 2007/0227017 A1    Oct. 4, 2007

Related U.S. Application Data

(63) Continuation-in-part of application No. 11/535,858, filed on Sep. 27, 2006, which is a continuation-in-part of application No. 11/140,476, filed on May 27, 2005, now abandoned, which is a continuation of application No. 10/277,474, filed on Oct. 22, 2002, now Pat. No. 6,914,930.

(60) Provisional application No. 60/736,818, filed on Nov. 15, 2005.

(51) Int. Cl.
    *G01C 15/00* (2006.01)
(52) U.S. Cl. .............. 33/291; 33/228; 33/290; 33/DIG. 21
(58) Field of Classification Search ........... 33/290–291, 33/228, 286, DIG. 21, 281–283
See application file for complete search history.

(56) References Cited

U.S. PATENT DOCUMENTS

| 4,090,781 | A   |   | 5/1978  | Godot et al.            |
|-----------|-----|---|---------|-------------------------|
| 4,852,265 | A   |   | 8/1989  | Rando et al.            |
| 4,912,851 | A   |   | 4/1990  | Rando et al.            |
| 4,934,061 | A   |   | 6/1990  | Knight et al.           |
| 5,459,932 | A   |   | 10/1995 | Rando et al.            |
| 5,524,352 | A   | * | 6/1996  | Rando et al. .... 33/291 |
| 5,539,990 | A   | * | 7/1996  | Le ............... 33/283 |
| 5,541,727 | A   |   | 7/1996  | Rando et al.            |
| 5,619,802 | A   |   | 4/1997  | Rando et al.            |
| 5,842,282 | A   |   | 12/1998 | Ting                    |
| 5,914,778 | A   |   | 6/1999  | Dong                    |
| 5,992,029 | A   |   | 11/1999 | Dong                    |
| 6,009,630 | A   |   | 1/2000  | Rando                   |
| 6,043,879 | A   |   | 3/2000  | Dong                    |
| 6,073,356 | A   |   | 6/2000  | Li                      |
| 6,133,996 | A   |   | 10/2000 | Plumb et al.            |
| 6,351,890 | B1  |   | 3/2002  | Williams                |
| 6,625,895 | B2  | * | 9/2003  | Tacklind et al. .... 33/286 |

(Continued)

*Primary Examiner*—Yaritza Guadalupe-McCall
(74) *Attorney, Agent, or Firm*—Edell, Shapiro & Finnan, LLC

(57) ABSTRACT

A tool incorporating a device that generates a light line on a work surface such as a wall is disclosed. The device includes a housing containing a self-leveling pendulum assembly and a light source that directs a light beam along a pathway. A redirection assembly, also contained in the housing, is capable of altering the pathway of the light beam prior to exiting the housing. In use, the device selectively generates a light line on the work surface in a desired direction.

50 Claims, 8 Drawing Sheets

U.S. PATENT DOCUMENTS

| | | |
|---|---|---|
| 6,763,596 B1 | 7/2004 | Puri et al. |
| 6,829,834 B1 | 12/2004 | Krantz |
| 6,848,188 B2 | 2/2005 | Tacklind et al. |
| 6,878,954 B2 | 4/2005 | Butler et al. |
| 6,914,930 B2 | 7/2005 | Raskin |
| 6,964,106 B2 * | 11/2005 | Sergyeyenko et al. ......... 33/286 |
| 7,134,211 B2 * | 11/2006 | Bascom et al. ................ 33/286 |
| 7,134,212 B2 * | 11/2006 | Marshall et al. ............... 33/286 |
| 7,155,835 B2 * | 1/2007 | Hayes et al. .................. 33/286 |
| 7,178,250 B2 * | 2/2007 | Nash et al. .................... 33/286 |
| 7,237,341 B2 * | 7/2007 | Murray ........................ 33/286 |
| 7,260,895 B2 * | 8/2007 | Long et al. .................... 33/286 |
| 7,310,886 B2 * | 12/2007 | Bascom et al. ................ 33/286 |
| 7,310,887 B2 * | 12/2007 | Nash et al. .................... 33/286 |
| 7,316,073 B2 * | 1/2008 | Murray ........................ 33/286 |
| 7,392,591 B2 * | 7/2008 | Milligan et al. ............... 33/286 |
| 2002/0162978 A1 | 11/2002 | Butler et al. |
| 2002/0166249 A1 | 11/2002 | Liao |
| 2003/0000355 A1 | 1/2003 | Butler et al. |
| 2003/0029050 A1 * | 2/2003 | Fung et al. .................... 33/626 |
| 2005/0078303 A1 * | 4/2005 | Murray ........................ 356/138 |
| 2005/0161241 A1 | 7/2005 | Frauhammer et al. |
| 2005/0204570 A1 | 9/2005 | Bascom et al. |
| 2006/0013278 A1 | 1/2006 | Raskin et al. |
| 2007/0124948 A1 * | 6/2007 | Nash et al. .................... 33/286 |
| 2007/0175054 A1 * | 8/2007 | Murray ........................ 33/286 |
| 2007/0227017 A1 * | 10/2007 | Milligan et al. ............... 33/228 |

\* cited by examiner

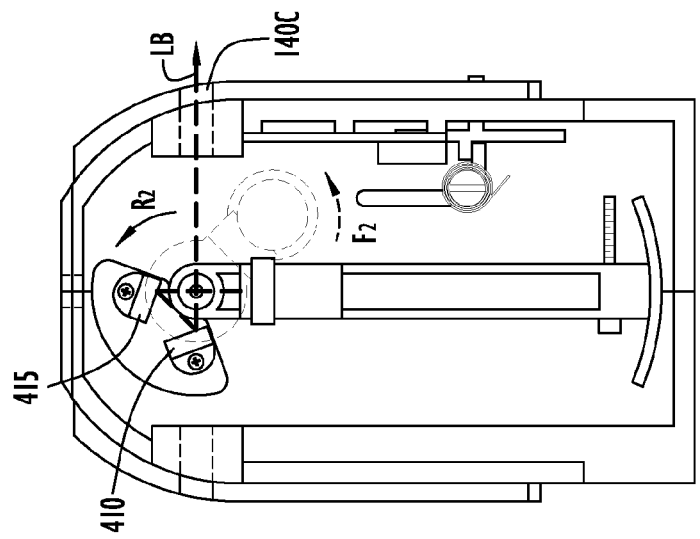
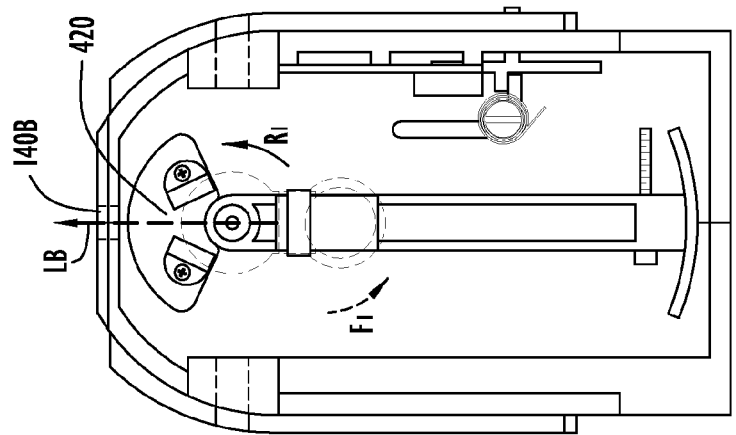
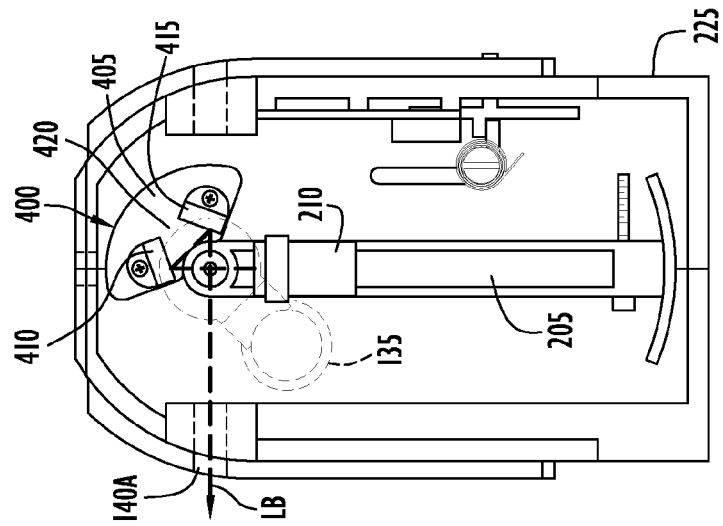

US 7,523,558 B2

TOOL INCORPORATING A LIGHT LINE GENERATING DEVICE

CROSS REFERENCE TO RELATED APPLICATIONS

This application is continuation-in-part of U.S. application Ser. No. 11/535,858, filed on 27 Sep. 2006 and entitled "Light Line Generating Device", which is nonprovisional of Provisional Application No. 60/736,818, filed on 15 Nov. 2005 and entitled "Laser Level", and which is a continuation-in-part of U.S. application Ser. No. 11/140,476, filed on 27 May 2005 and entitled "Laser Level", which is a continuation of U.S. patent application Ser. No. 10/277,474, filed 22 Oct. 2002 and entitled "Laser Level", now U.S. Pat. No. 6,914,930. The disclosures of the aforementioned application and patent documents are incorporated herein by reference in their entireties.

FIELD OF THE INVENTION

The present invention relates to a hand tool including light line generating device and, in particular, to a hand tool including self-leveling laser level with a light beam redirection assembly operable to selectively direct a single source laser beam in a plurality of directions.

BACKGROUND OF THE INVENTION

Alignment of surfaces is a common problem in a variety of fields, ranging from construction to interior decorating. Proper spatial alignment is necessary to ensure that walls are perpendicular to a floor, or otherwise plumb. Laser level devices are often used in construction to produce a plane of light that serves as a reference for various projects. Laser level devices save considerable time and effort during the initial layout of a construction project as compared to other tools such as beam levels, chalk lines, or torpedo levels. Some examples of projects where laser level devices are useful include laying tile, hanging drywall, mounting cabinets, installing counter tops, and building outdoor decks.

SUMMARY OF THE INVENTION

The present invention is directed toward a portable, handheld tool with a light generating device incorporated therein. The handheld tool may be a power (motorized) tool such as a cordless drill. The light line generating device may be configured to form a light line on a work surface. The light line generating device may include a light source, a pendulum assembly, and/or a light redirection assembly. The pendulum assembly may include a self-leveling pendulum with the light coupled thereto. The light redirection assembly is configured to alter the travel path of the light emitted by the light source. The light redirection assembly, for example, may include a series of mirrors that are selectively repositioned into and out of the travel path of the light beam. In operation, a user may use the light line generating device to determine a reference (e.g., plumb or horizontal) on a generally vertical surface, and then act upon the surface with the handheld tool.

BRIEF DESCRIPTION OF THE DRAWINGS

FIG. 2 illustrates an isolated view of the light generating device incorporated into the tool shown in FIG. 1A in accordance with an embodiment of the present invention. Specifically.

FIGS. 4A-4C illustrate the light generating device of FIG. 2B, showing the operation of the light beam redirection assembly.

Like reference numerals have been used to identify like elements throughout this disclosure.

DETAILED DESCRIPTION OF THE INVENTION

Figure 1A:
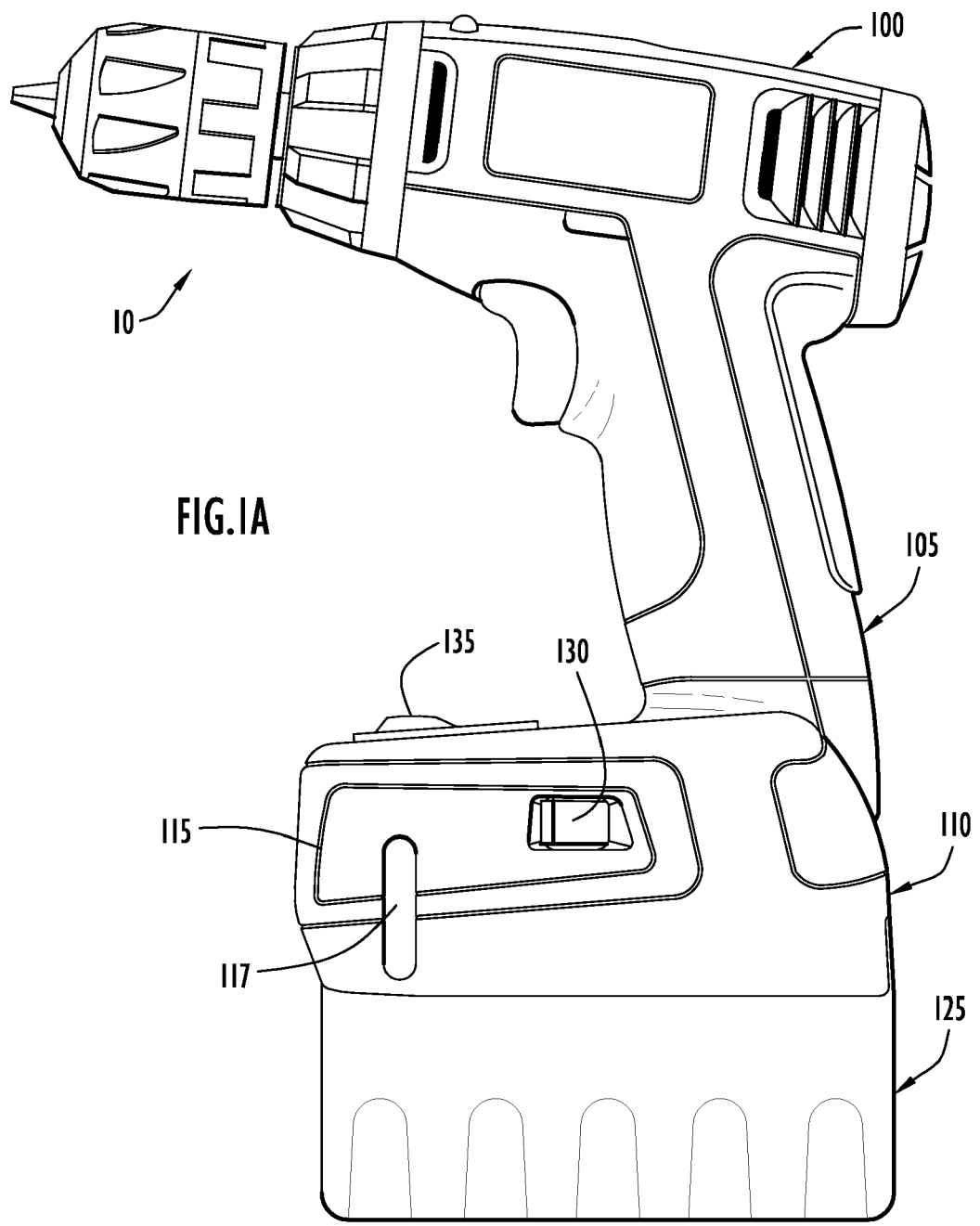
FIG. 1A illustrates a side view in elevation of a handheld tool incorporating a light generating device in accordance with an embodiment of the present invention.

FIG. 1A is side view in of a tool 10 incorporating a light generating device according to an embodiment of the present invention. As illustrated, the tool 10 may include a tool portion 100 (e.g., a drill), a handle portion 105 and a support base 110. The tool portion 100 may include a tool element that acts on a work surface such as a wall. By way of example, the tool element may be a drill bit or other drill attachment. The tool 10 may be formed from a hard, impact-resistant, preferably moldable material such as a hard thermoplastic material (e.g., ABS or polystyrene). The tool 10 may also include a grip portion formed from soft or low durometer thermoplastic elastomer. Alternatively or additionally, the grip portion may be formed from "soft-touch" elastomer materials such as SANTOPRENE, KRATON, and MONOPRENE. In addition, the base 110 may include a power source 125 operable to connect thereto (e.g., when the tool 10 is cordless device a battery power source may be utilized).

Figure 1B:
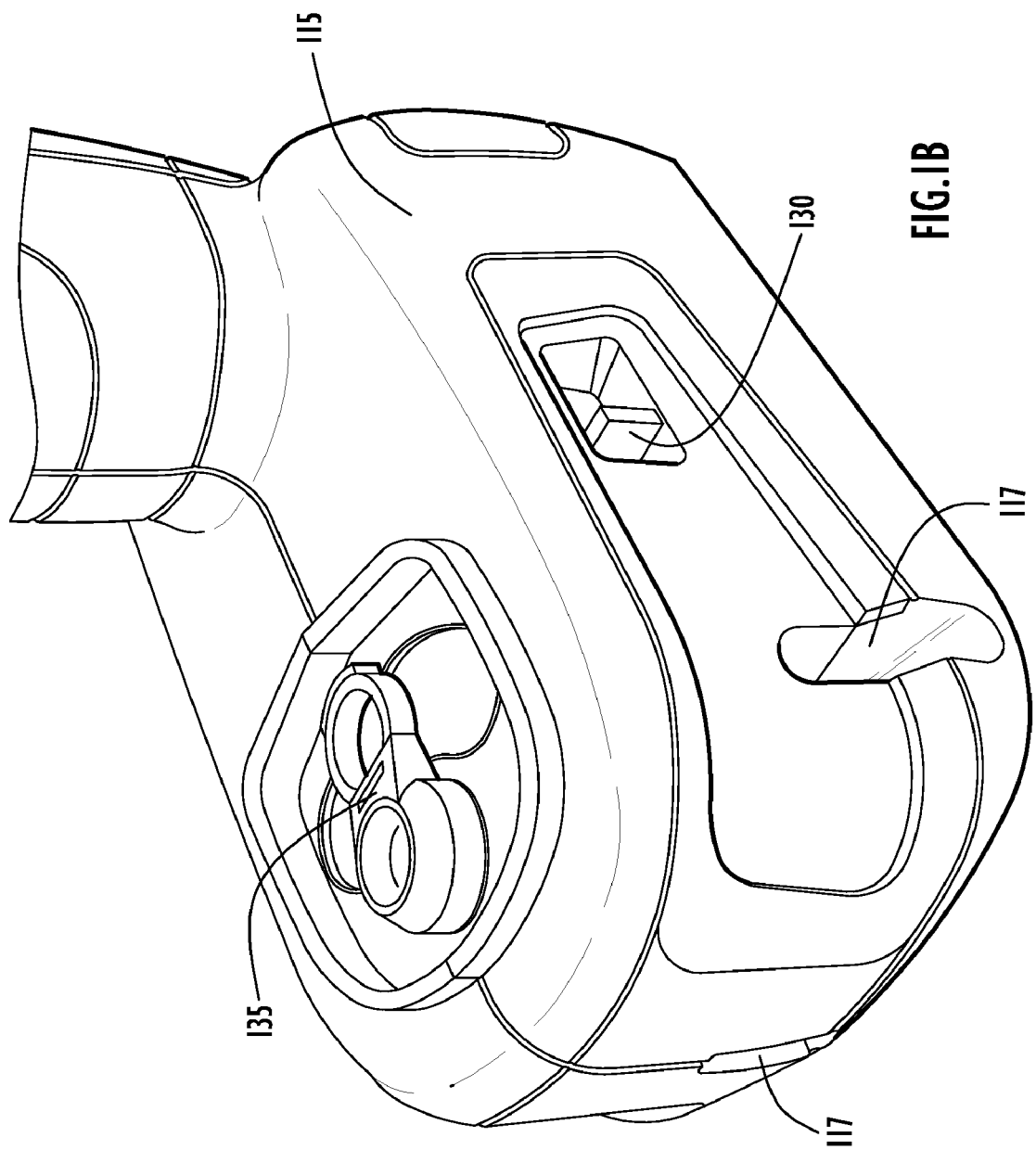
FIG. 1B illustrates a close-up view of the base of the tool shown in FIG. 1A.
Figure 2A:
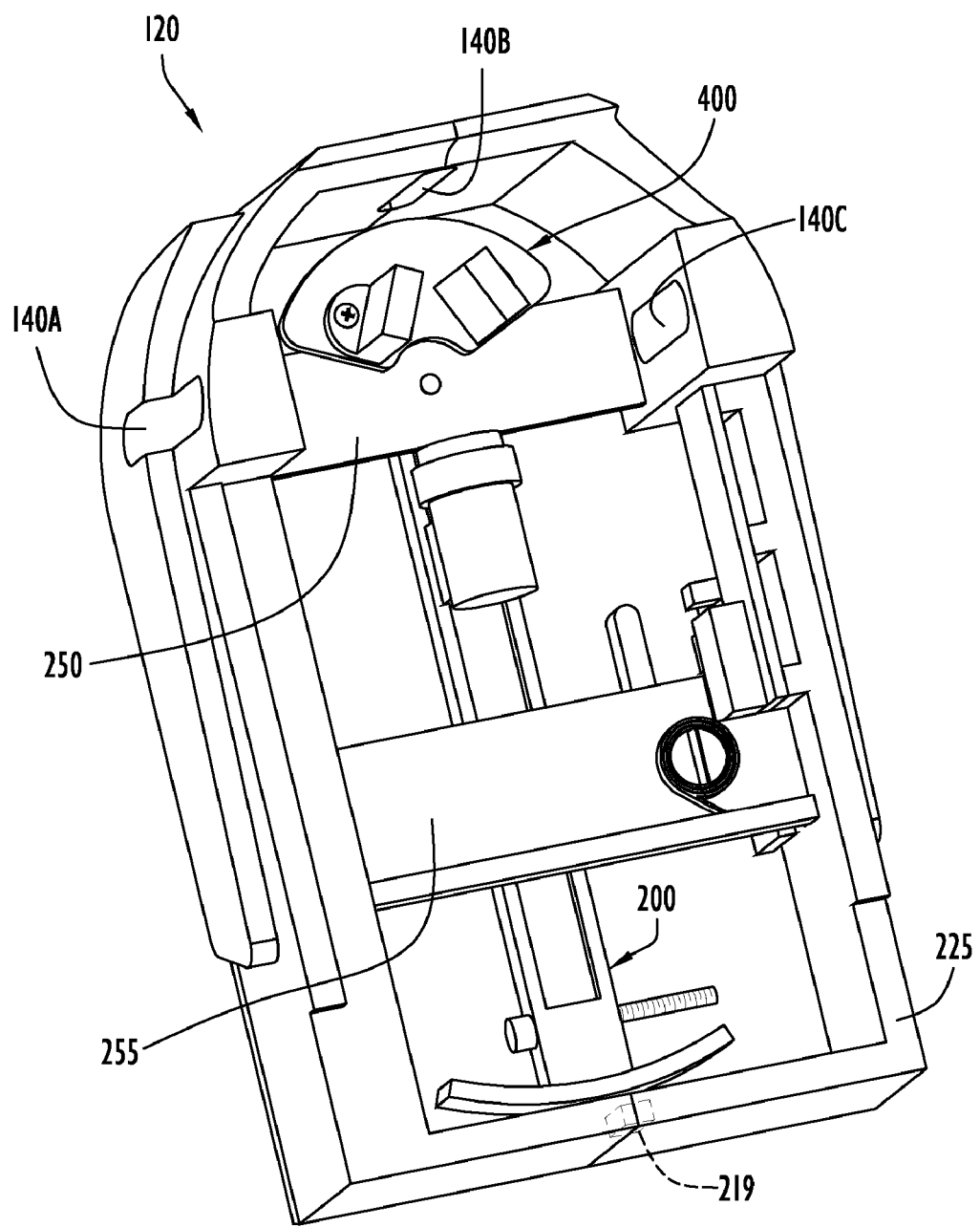
FIG. 2A illustrates an isolated view of the light generating device.
Figure 2B:
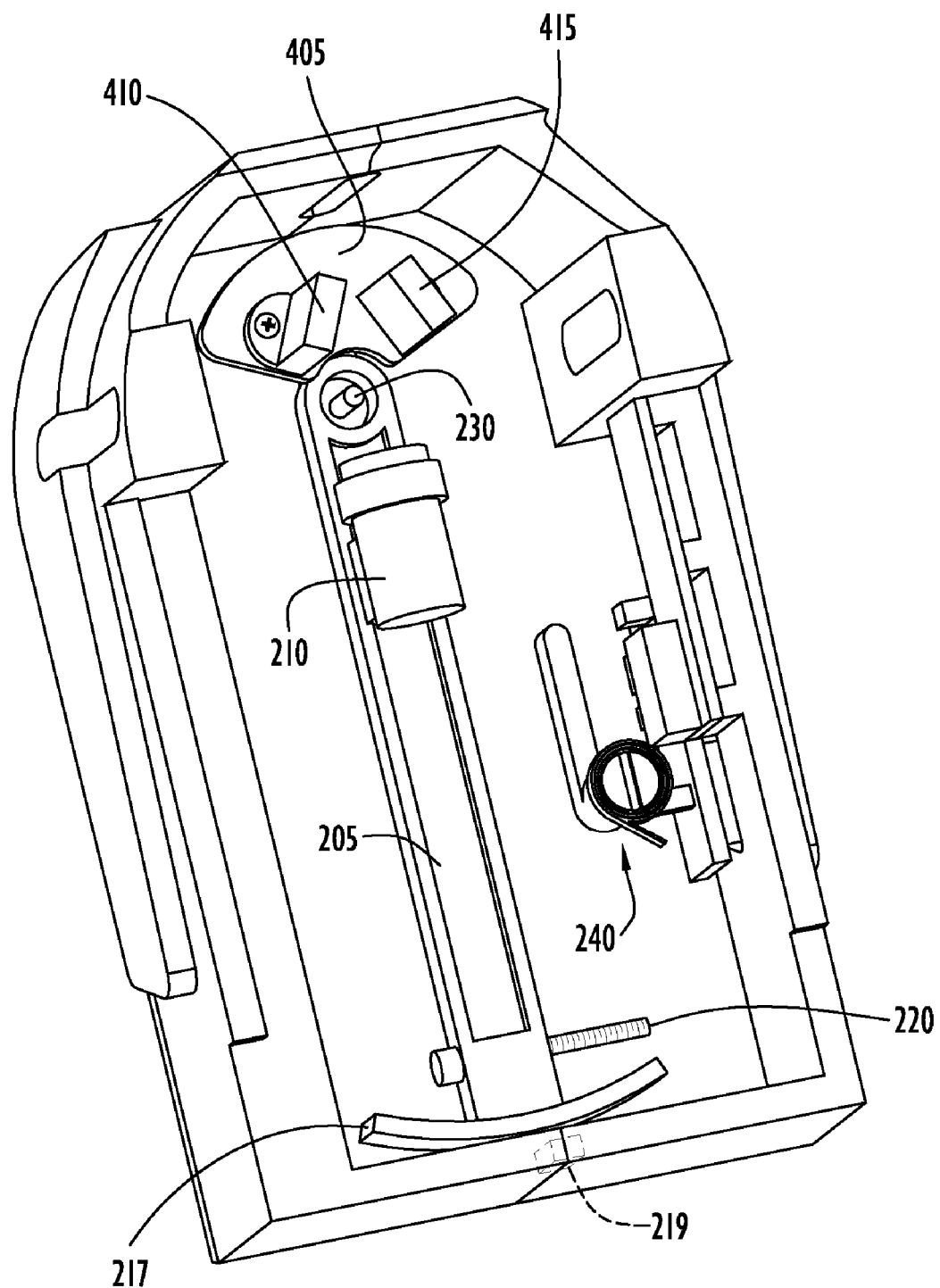
FIG. 2B illustrates the light generating device of FIG. 2A, with support braces removed for clarity.
Figure 2C:
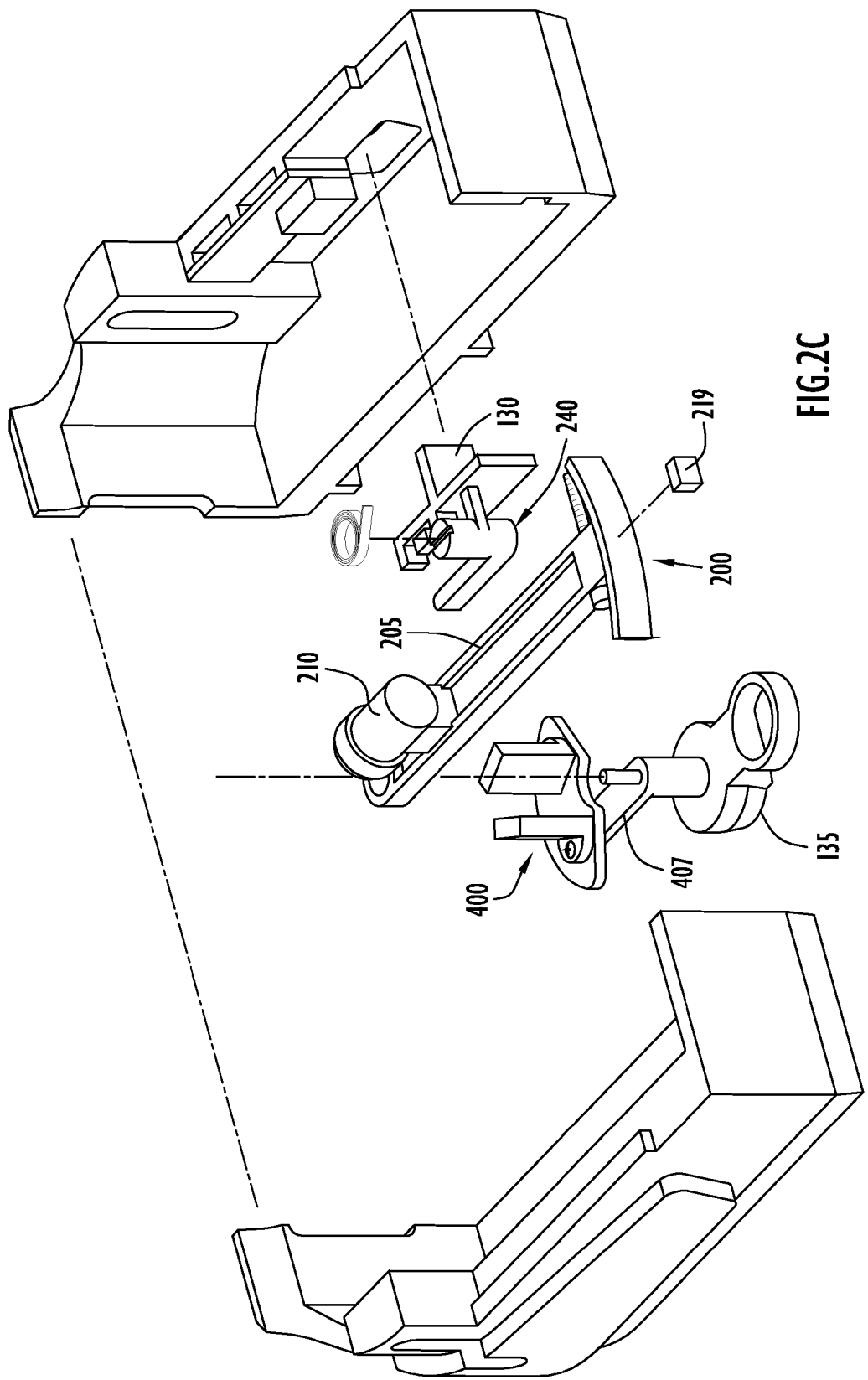
FIG. 2C illustrates an exploded view of the light generating device of FIG. 2B.

Referring to FIG. 1B (showing a close-up view of the support base 110 with the power source 125 removed for clarity), the support base 110 may be in the form of a housing 115 that contains a light generating device 120 (seen in FIGS. 2A-2C). The base 110 may further include a first actuator 130 that controls the power and/or lock mechanism of the light line generating device, as well as a second actuator 135 configured to control a light beam redirection assembly (all discussed in greater detail below). The base housing 115 further includes openings 117 aligned with windows disposed on the light generating device 120 (the windows, referenced as 140A, 140B, and 140C, are seen in FIGS. 2A-2C).

FIG. 2 shows an isolated view of the light generating device 120 incorporated into the base 110 of the tool 10. Specifically, FIG. 2A illustrates an isolated view of the light generating device; FIG. 2B illustrates the light generating device of FIG. 2A, with support braces removed for clarity; and FIG. 2C illustrates an exploded view of the light generating device of FIG. 2B. In the illustrated embodiment, the light generating device 120 includes a cage or shell 225 with one or more windows operable to permit the transmission of a light beam from the cage 225. The term "window" not only includes an opening with a transparent or translucent covering, but also to uncovered apertures through which a beam of light may pass. In the embodiment illustrated in FIGS. 2A-2C, the cage 225 includes a first window 140A, a second window 140B, and a third window 140C angularly spaced from each other. The angle between a pair of windows may include, but is not limited to, approximately 45°-90°. By way of specific example, the second window 140B may be generally aligned with a generally vertical axis extending through the cage 225, while the first window 140A and/or the third window 140C may be aligned along a generally horizontal axis extending through the cage 225. The cage 225 may further include a first support brace 250 and a second support brace 255 to provide additional structural rigidity to the cage, as well as provide support to elements housed therein.

The cage 225 of the light generating device 120 houses a pendulum assembly 200, a pendulum lock mechanism 240, and a light beam redirection assembly 400. Referring to FIG. 2B, the pendulum assembly 200 may include a pendulum 205, a light generating assembly or light source 210, a damping mechanism 215, and a calibration mechanism 220. The pendulum 205 may be coupled to the cage 225 such that it freely pivots therein (i.e., it may be pendulously suspended within the cage 225). By way of example, the pendulum 205 may be rotatably coupled to a post 230 extending from the second actuator 135 and into the interior surface of the cage 225. A guide member (not illustrated) may be positioned above the post 230 to direct and/or limit the degree and/or direction of pivot in the pendulum 205. The degree of pendulum pivot is not particularly limited. By way of example, the pendulum 205 may swing about 12° (±6° from its normal (0°) position). One or more bearings 245 (best seen in FIG. 3) may optionally be provided between the pendulum 205 and the post 230 to allow for a more fluid and consistent motion.

Figure 5:
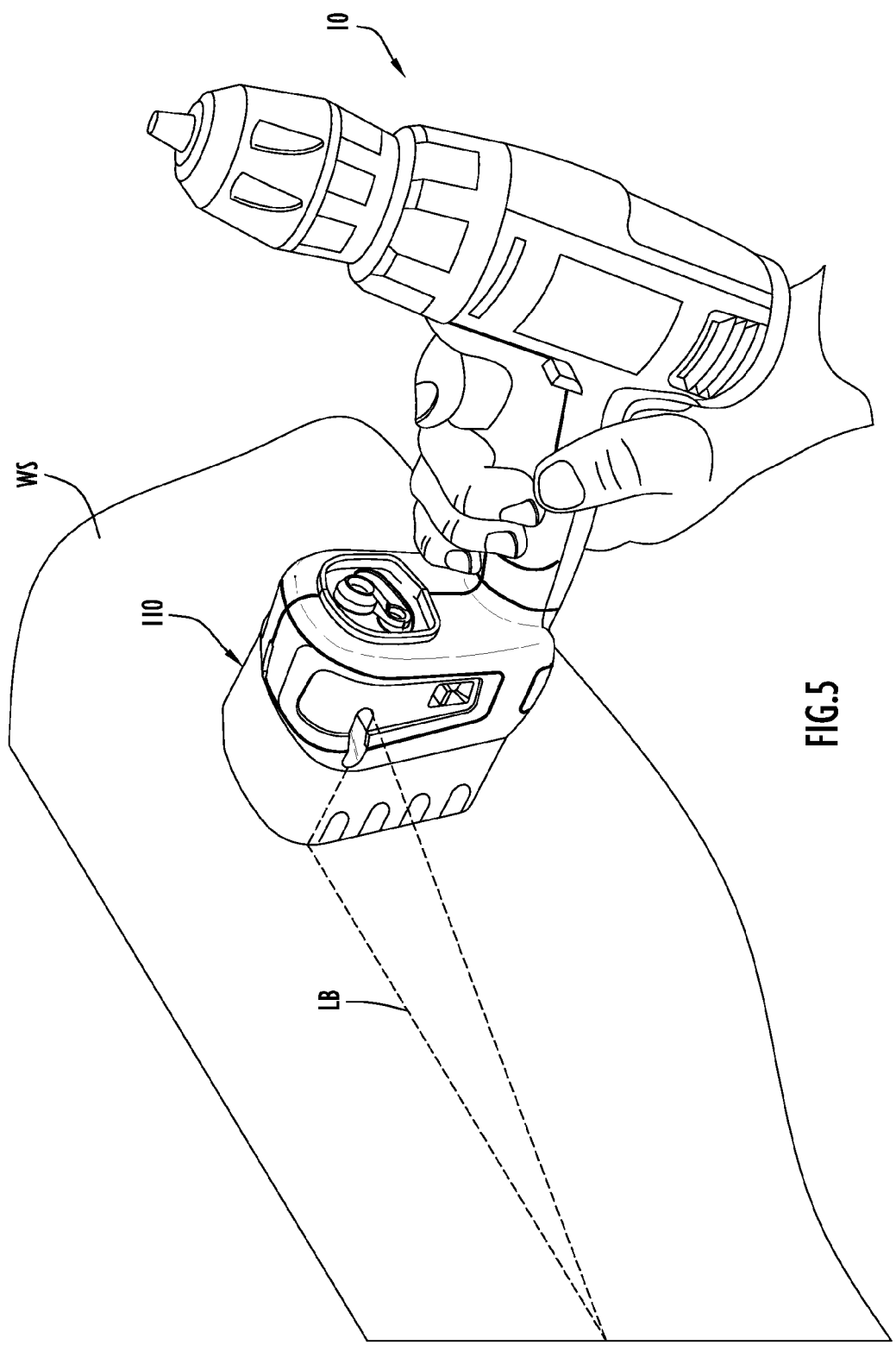
FIG. 5 illustrates the handheld tool of FIG. 1A acting on a work surface.

In operation, the pendulum 205 is capable of swinging within the cage 225 about a pivot axis which is generally transverse to the light beam generated by the light source 210 (i.e., the axis defined by the post 230). As a result, the pendulum 205 is self-leveling, creating a substantially vertical (plumb) and/or horizontal (level) light line when the bottom surface of the base 110 is placed against a generally vertical work surface such as a wall (FIG. 5). The pendulum 205 may self-level even if the work surface is uneven, or even if the device 10 is placed against the work surface in a slightly tilted orientation.

The light source 210 may be configured generate light directed along a pathway. For example, the light source may generate a light beam LB (see FIGS. 5A-5C) such as a light plane and/or a light line. The light source 210 may be fixed to the pendulum 205, proximate its upper end (i.e., closer to the redirection assembly 400 (described below)). By way of example, the light source 210 may include, but is not limited to, a laser assembly including a barrel that houses a laser diode, a collimating lens, and/or a line lens. The collimating lens forms a laser beam exiting the laser diode into a beam having a generally oval cross-section. The line lens then converts the laser beam into multiple, super-imposed planar beams (i.e., laser planes having different focal distances). Additional information regarding the configuration of the light source 210, and in particular, an exemplary laser assembly, is disclosed in U.S. Published Patent Application No. 2006/0013278 (Raskin et al.); as well as U.S. patent application Ser. No. 11/535,858; the disclosures of which is incorporated herein by reference in their entireties.

In operation, the light source 210 generates the light beam LB, directing it along a pathway (e.g., a generally vertical pathway) toward the redirection assembly 400. The light beam LB then travels out of the cage 225 via a window 140A, 140B, 140C and through the opening 117 in the base 110, generating a light line onto a work surface.

The damping mechanism 215 is capable of decreasing the amplitude of the pendulum 205. The damping mechanism 215 may be any mechanism suitable for its described purpose (i.e., damping the motion of pendulum 205). By way of example, the damping mechanism 215 may include curved bar 217 with a metal (e.g., copper) plate on its underside. The interior surface of the cage 225 may include a magnet 219 configured to align with the metal plate on the curved bar 217 such that a precise gap is maintained between the bar 217 and the magnet 219 as the pendulum 205 swings about the post 230. The interaction between the eddy currents in copper plate with the magnetic field of the magnets causes damping of swaying motion of pendulum 205. Further information regarding the damping mechanism 215 may be found in U.S. Pat. No. 5,144,487, the disclosure of which is incorporated herein by reference in its entirety.

The calibration mechanism 220 of the pendulum assembly 200 operates to calibrate the orientation of the pendulum 205. By way of example, the calibration mechanism 220 may include a balance screw disposed proximate the base of the pendulum 205. The calibration mechanism 220 may be utilized to adjust the pathway of the laser beam LB and, in particular, to allow the light source 210 to be angularly adjusted along a vertical plane relative to the cage 225.

Figure 3B:
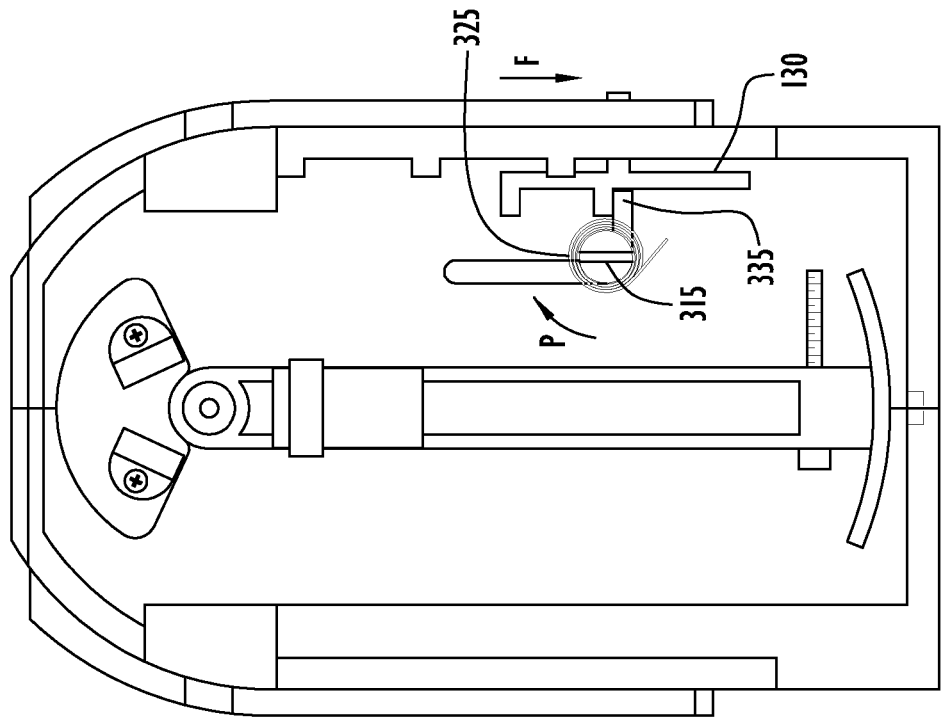
FIGS. 3A-3B illustrate the light generating device of FIG. 2B, showing the operation of the pendulum lock mechanism in accordance with an embodiment of the present invention.
Figure 3A:
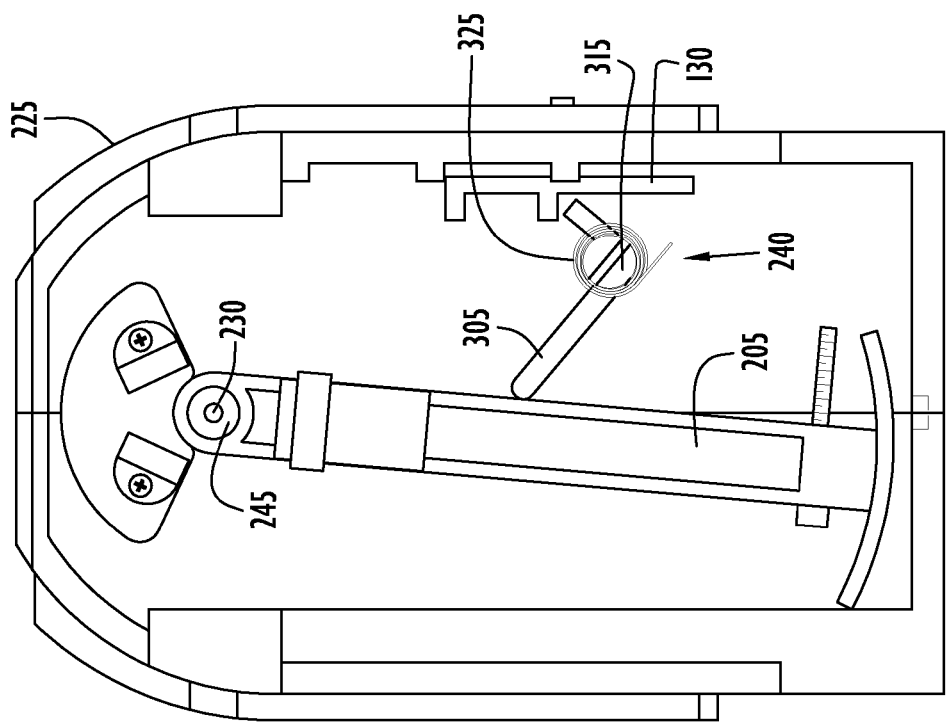

The lock mechanism 240 stabilizes the pendulum 205, preventing its pivotal motion within the cage 225 of the light line generating device 10. FIGS. 3A and 3B are internal views of the light line generating device 10, showing the pendulum lock mechanism 240. The lock mechanism 240 may include a lever 305 biased into engagement with the pendulum 205. Specifically, the lock mechanism 240 includes a lever 305 and a shaft 315 that is pivotally coupled to the cage 225 (e.g., via second support brace 255 (FIG. 2A)). The shaft 315, in turn, is in selective communication with the first actuator 130. A spring 325 biases the lever 305 such that, in its normal position, the lever engages the pendulum 205, capturing the pendulum against the cage 225 to prevent its pivotal motion. The first actuator 130 may be engaged to selectively drive the lever 245 away from the pendulum 205. Once disengaged, the pendulum 205 is free to pivot/swing about the post 230.

The operation of the pendulum assembly 200 and associated lock mechanism 240 is explained with reference to FIGS. 3A and 3B. Referring to FIG. 3A, the first actuator 130 begins in a first, normal position. In this position, the lever 305 is spring biased such that it engages the pendulum 205, preventing its pivotal movement. This, in turn, generally immobilizes the light source 210. Engaging the first actuator 130 by applying a force (as indicated by arrow F in FIG. 3B) moves the first actuator 130 from its first position to a second position. As the first actuator slides downward, it engages a tab 335 extending from the shaft 315, rotating the shaft and lever 305 (indicated by arrow P) to drive the lever 305 of the lock mechanism 240 away from the pendulum 205. In this second position, the pendulum 205 is free to pivot about the post 230 within the cage 225, engaging the self leveling feature, where the light source 210 directs the light beam LB in a substantially vertical direction (from the perspective of FIGS. 3A and 3B). The lock mechanism 240, then, selectively prevents the movement of the pendulum 205 relative to the cage 225, helping to prevent damage to the pendulum 205 during storage and/or transport.

The first actuator 130 may also communicate with an electronic switch that activates the light source 210, generating a light beam LB. Thus, the pendulum 205 may be unlocked concurrently with the activation light source 210 to generate self-leveling (or self-adjusting) horizontal or vertical lines. In this manner, a user may selectively activate the light source 210 and/or self-leveling feature of the light generating device 120. Alternatively, the light generating device 120 may be configured to generate a light beam LB while the pendulum is locked, enabling a user to stabilize the light line generated on the work surface, preventing the light line from self-leveling. For example, the tool 10 may be rotated manually to project a light line onto the work surface at an angle other than substantially horizontal and/or substantially vertical (not illustrated).

The redirection assembly 400 includes a structure operable to selectively redirect the light beam LB generated by the light source 210 in a plurality of directions. For example, the redirection assembly 400 may be configured to direct the light beam LB from the light source 210 through any of the first window 140A, the second window 140B, or the third window 140C of the cage 225. In the embodiment illustrated in FIGS. 4A-4C, the redirection assembly 400 is a mirror assembly including a base or platform 405 with a first mirror 410 and a second mirror 415. The positioning of the mirrors 410, 415 is not particularly limited to that illustrated herein, so long as the mirrors 410, 415 are capable of selectively redirecting (altering the travel path of) the light beam LB by the desired angle. The first mirror 410, for example, may be spaced approximately 45° from the second mirror 415, creating a gap 420 between the first mirror 410 and the second mirror 415. In other words, each mirror 410, 415 may be about 22.5° from a generally vertical line intersecting the gap 420 between the mirrors. This positions the mirrors 410, 415 such that the light beam LB traveling from the light source 210 (e.g., along a substantially vertical pathway) may either reflect off the mirror pair 410, 415 or pass through the gap 420 (discussed in greater detail below).

One or both mirrors 410, 415 may further be associated with a calibration tool (e.g., a spring biased screw (not illustrated)) configured to angularly adjust the position of a mirror on the platform 405 and, as such, the position of one mirror 410, 415 with respect to the other mirror 410, 415. For example, the second mirror 415 is fixed to the platform 405, while the first mirror 410 is adjustable.

The redirection assembly 400 is moveable with respect to the cage 225. The platform 405 of the redirection assembly 400 may be coupled to the second actuator 135 via a bridge 407 (best seen in FIG. 2A) such that movement of the second actuator causes a corresponding movement in the platform 405. Specifically, rotating the second actuator 135 rotates the platform 405 supporting the mirrors 410, 415, reorienting the redirection assembly 400 and altering the relationship of the mirrors 410, 415 with respect to the light source 210/light beam LB. Detents may be provided to indicate the desired rotational stopping points for the platform 405. With this configuration, the platform 405 rotates about the same axis as the pendulum 205 (the axis defined by the post 230).

With this configuration, the second actuator 135 may be utilized to selectively alter the travel path of the light beam LB generated by the light source 210 as it travels through the cage 225 and, as such, the position of the light line formed on a work surface. Operation of the redirection assembly 400 of the light generating device 120 in accordance with the present invention is explained with reference to FIGS. 4A, 4B, and 4C. As explained above, the light source 210 may be mounted on the pendulum 205 such that the light beam LB generated by the light source 210 is directed toward the redirection assembly 400. Referring to FIG. 4A, the redirection assembly 400 may be oriented in a first position, in which the light beam LB may be redirected about −90° such that the light beam is directed out of the first window 140A. Specifically, the first mirror 410 is positioned within the travel path of the light beam LB, causing the light beam to reflect off of the first mirror 410, then off of the second mirror 415. This redirects the light beam LB from a substantially vertical travel path to a substantially horizontal travel path (from the viewpoint of FIG. 4), enabling the light beam to exit the cage 225 (and thus the base 110) through the first window 140A.

As explained above, engaging the second actuator 135 repositions the mirror assembly 400 with respect to the light source 210. Referring to FIG. 4B, applying a force (indicated by arrow $F_1$) causes the second actuator 135 to rotate, moving the redirection assembly 400 (indicated by arrow $R_1$) from the first position to a second position. The degree of rotation may include, but is not limited to, approximately 45°. In this second position, neither the first mirror 410 nor the second mirror 415 is positioned in the travel path of the light beam LB. As a result, the light beam LB maintains its original travel path, passing through the redirection assembly 400 (through the gap 420 between the mirrors 410, 415) and out the second window 140B.

Referring to FIG. 4C, continuing to apply a force F to the second actuator 135 (indicated by arrow $F_2$) rotates the redirection assembly 400 (indicate by arrow $R_2$) within the cage 225 to orient the redirection assembly 400 in a third position. The degree of rotation may include, but is not limited to, approximately 45°. In this third position, the light beam LB may be redirected about 90° such that it is directed out of the third window 140C. Specifically, the second mirror 415 is now positioned in the travel path of the light beam LB, causing the light beam to reflects off of the second mirror 415, and then off of the first mirror 410. This redirects the substantially vertical travel path of the light beam LB to a substantially horizontal travel path, causing the light beam to exit the cage 225 through the third window 140C.

In this manner, a user may selectively orient the redirection assembly 400 to selectively control/direct the travel path of the light beam LB generated by the light source 210. This configuration permits a single light source 210 to generate a light line on a work surface in a plurality of different directions (e.g., horizontal left, vertical, horizontal right). In addition, each light line generated on the work surface may be self-leveling due to the pendulum assembly 200. In order to return the redirection assembly 400 back to the first or second positions, an opposite force (not illustrated) may be applied to the second actuator 135, rotating the redirection assembly in an opposite direction.

FIG. 5 illustrates an exemplary use of the tool. As shown, in operation, the tool 10 is oriented in a first position, in which the light generating device is used to create a light line on a work or supporting surface WS such as a wall. Specifically, the bottom surface of the base 110 may be placed against a generally vertical work surface. The light source 210 may be activated to produce a light beam LB, generating a light line on the work surface. The pendulum assembly 200 provides the self-leveling feature as described above, while the redirection assembly 400 enables a user to selectively direct the light beam LB out of a desired window 140A, 140B, 140C (also described above). The light line generated on the work surface may be used to create reference marks using, e.g., a pencil. A user may reorient the tool 10 from the first position to a second position to act upon (e.g., drill into) the work surface WS, using the reference marks as a guide.

Alternatively, the light beam LB may be fixed with respect to the base 120 (using the lock mechanism 240 as described above), instead of leveling, the user may manually reposition the light beam LB by rotating the tool 10 with respect to the work surface. This configuration enables a user to direct a light line in a desired direction, depending on the alignment needs of the work surface.

With the above configuration, the tool 10 provides two modes of operation, one in which the tool portion is capable of operating on the work surface, and a second in which the light generating device is capable of generating a light line on the work surface. Explained another way, the tool element may define an axis. In the first mode, the axis of the tool element may be oriented substantially perpendicular to the work surface WS. In the second mode, the axis of the tool element may be oriented substantially parallel to the work surface.

While the present invention has been described in detail and with reference to specific embodiments thereof, it will be apparent to one skilled in the art that various changes and modifications can be made therein without departing from the spirit and scope thereof. For example, the tool 10 may include any tool suitable for acting on a work surface. Though a cordless drill is illustrated, the tool 10 may include other corded and cordless tools such as a saw, a screwdriver, a nail gun, a staple gun, etc. The power source includes any combination of alternating and direct current power sources. The light generating assembly 210 may be powered by the same power source providing power to the motor of the tool 10, or may be powered by a separate power source (e.g., the light generating assembly 210 may have its own power source such as a separate battery source).

The tool 10 may further include a measuring tool configured to respond to the rotation of the tool 10 on a work surface as described in U.S. patent application Ser. No. 11/535,858, incorporated herein by reference.

The cage 225 of the light generating device 120 may possess any suitable dimensions, and may be any shape suitable for its described purpose. The light source 210 may be any source capable of producing a light beam and directing it toward the redirection assembly 400. Though shown as fixed to the pendulum 205, the light source 210 may slide along to pendulum to adjust the distance between the light source and the redirection assembly 400. The pendulum lock mechanism may be configured such that the lever 245 is spring biased out of engagement with the pendulum 205, wherein the first actuator 130 forces the lever 245 into engagement with the pendulum 205.

The number, location, shape, or dimensions of the windows 140A, 140B, 140C is not particularly limited to that which is illustrated herein. When a plurality of windows is present, the windows may be angularly spaced about the cage 225 at any angle suitable for their described purpose. The windows 140A, 140B, 140C may be of any shape and include any desired dimensions. The windows 140A, 140B, 140C, moreover, may be sized to prevent the light beam LB from projecting out of cage 225 when the pendulum assembly 200 contacts another component disposed within housing 100. Additionally, the windows 140A, 140B, 140C may further prevent the light beams LB from exiting the cage 225 when the pendulum assembly 200 approaches the limits of its angular range. In other words, assuming an angular range being between about −6° to about +6° from normal (i.e., a vertical centerline to where the pendulum assembly 200 self-levels), and where pendulum assembly 200 may travel at any angle beyond this range, the size and/or shape of the windows 140A, 140B, 140C may be configured to block the light beams when the pendulum 205 travels beyond about −5° and/or about +5° from normal. This configuration prevents a user from relying on the emitted beam (as substantially horizontal or vertical) when the pendulum has nearly reached or surpassed its range of motion, as the beam may no longer actually represent true plumb or horizon.

The redirection assembly 400 may include any structure configured to selectively redirect the light beam LB generated by the light source 210. By way of specific example, instead of a mirror pair 410, 415, the redirection assembly 400 may include a prism to alter the pathway of the light beam LB. By way of further example, a pentaprism may be positioned on the platform 405. The five-sided reflecting prism may be selectively positioned (e.g., rotated) into the travel path of the light beam LB, redirecting the light beam by 90°. The redirection assembly 400, moreover, may be selectively rotated in clockwise and/or counterclockwise directions. The platform 405 redirection assembly may pivot about the same axis as the pendulum 205, or may pivot about a separate axis. In addition, the second actuator 135, operable to rotate redirection assembly 400, may include any suitable switch and be disposed at any suitable location. By way of specific example, the second actuator may include a slide switch extending through the cage 225.

The tool 10 may further include a stud sensor circuit. Information relating to the stud sensor circuitry may be found in U.S. Pat. Nos. 4,099,118 and 4,464,622, the disclosures of which are herein incorporated by reference in their entireties. The tool, and in particular, the light generating device, may further include one or more spirit or bubble vials disposed at appropriate locations.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

We claim:

1. A tool adapted to act on a work surface comprising:
a tool portion; and
a light generating device portion comprising:
a self-leveling pendulum assembly including a pendulum pendulously suspended within the light generating device;
a light source fixed to the pendulum, wherein the light source generates light directed along a first pathway;
a light redirection assembly capable of moving from a first position to a second position to selectively redirect the light from the first pathway to a second pathway;
a lock mechanism operable to secure the pendulum and prevent its pivotal motion; and
an actuator operable to selectively engage and disengage the lock mechanism and to selectively activate and deactivate the light source.

2. The tool of claim 1, wherein the pendulum assembly further comprises a damping mechanism.

3. The tool of claim 1, wherein:
the redirection assembly rotates about an attachment point;
the light source generates a light beam that creates a light line on the work surface; and
rotating the redirection assembly from the first position to the second position alters the position of the light line generated on the work surface.

4. The tool of claim 1, wherein the light redirection assembly comprises a first mirror angularly spaced from a second mirror.

5. The tool of claim 4, wherein:
in the first redirection assembly position, the first mirror is oriented in the pathway of the light generated by the light source to redirect the light from the first pathway to the second pathway; and
in the second redirection assembly position, the second mirror is oriented in the pathway of the light generated by the light source.

6. The tool of claim 4, wherein:
in the first redirection assembly position, either the first or second mirror is oriented in the pathway of the light generated by the light source to redirect the light from the first pathway to the second pathway; and
in the second redirection assembly position, neither the first nor the second mirror is oriented in the pathway of the light generated by the light source.

7. The tool of claim 1, wherein the light generating device generates a light line on the work surface.

8. The tool of claim 7, wherein movement of the redirection assembly from the first position to the second position alters the position of the light line generated on the work surface with respect to the tool.

9. The tool of claim 1, wherein the light source comprises a laser assembly including a laser diode and a collimating lens.

10. The tool of claim 9, wherein the laser assembly further comprises a line lens.

11. The tool of claim 1, wherein the tool portion comprises a power tool.

12. The tool of claim 11, wherein the light source and the power tool are powered by the same power source.

13. The tool of claim 11, wherein the light source is powered by a different power source than the power source powering the power tool.

14. The tool of claim 11, wherein the power tool comprises a drill.

15. The tool of claim 1, wherein:
the light source directs the light in a substantially vertical direction; and
the light redirection assembly is capable of redirecting the light from the substantially vertical direction to a substantially horizontal direction.

16. A tool operable to act on a work surface comprising:
a tool portion; and
a light line generating device comprising:
   a housing;
   a self-leveling pendulum assembly disposed within the housing including:
      a pendulum, and
      a light source operable to create a light line on a work surface, wherein the light source emits a light beam traveling in a first direction, and
   a redirection assembly disposed within the housing, the redirection assembly comprising a mirror assembly including a first mirror and a second mirror,
wherein the redirection assembly is movable from a first position, in which the assembly permits the light beam to continue traveling in the first direction, to a second position, in which the assembly redirects the light beam from the first direction to a second direction.

17. The tool of claim 16, wherein:
the housing includes a first window and a second window;
in the first direction, the light beam is directed out of the first window; and
in the second direction, the light beam is directed out of the second window.

18. The tool of claim 17, wherein:
the housing further includes a third window;
the redirection assembly is movable to a third position, in which the assembly redirects the light beam from the first direction to a third direction; and
in the third direction, the light beam is directed through the third window.

19. The tool of claim 16, wherein the redirection assembly is further movable to a third position, in which the redirection assembly redirects the light beam from the first direction to a third direction.

20. The tool of claim 16, wherein the light source comprises a laser assembly including a laser diode, a collimating lens, and a line lens.

21. The tool of claim 16, wherein the redirection assembly is rotatable between the first position and the second position, and vice versa.

22. The tool of claim 16, wherein the pendulum assembly is capable of pivoting within a plane that is generally transverse to the light beam first direction.

23. The tool of claim 16 further comprising a lock mechanism operable to secure the pendulum assembly, selectively preventing the pivotal motion of the pendulum assembly.

24. The tool of claim 16, wherein the tool portion comprises a drill.

25. A motorized tool adapted to act on a work surface comprising:
a tool portion including a motor housing containing a motor, the motor driving a tool element to act on the work surface; and
a light generating device including a light source operable to generate a light line on the work surface,
wherein the motorized tool is operable in a first mode, in which the tool portion acts on the work surface, and in a second mode, wherein the light generating device forms a light line on the work surface.

26. The motorized tool of claim 25, wherein, in the first mode, the motorized tool is oriented in a first position with respect to the work surface and, in the second mode, the motorized tool is oriented in a second position with respect to the work surface.

27. The motorized tool of claim 25, wherein the light generating device is disposed in spaced relation with respect to the motor housing.

28. The motorized tool of claim 25, wherein:
the light source generates light directed along a first pathway; and
the light generating device further comprises a light redirection assembly capable of moving from a first position to a second position to selectively redirect the light from the first pathway to a second pathway.

29. The motorized tool of claim 28 further comprising a handle portion including a first end coupled to the motor housing and a second end, wherein:
a base is coupled to the second end of the handle; and
the light generating device is housed within the base.

30. The motorized tool of claim 29, wherein:
the base includes a first window and a second window;
in the first pathway, the light is directed out of the first window; and
in the second pathway, the light is directed out of the second window.

31. The motorized tool of claim 25, wherein:
the light generating device comprises a self-leveling pendulum assembly including a pendulum; and
the light source is coupled to the pendulum.

32. The motorized tool of claim 25, wherein the tool portion comprises a drill and the tool element comprises a drill bit.

33. The motorized tool of claim 25, wherein the tool element defines an axis and:
   in the first mode, the axis of the tool element is oriented substantially perpendicular to the work surface; and
   in the second mode, the axis of the tool element is oriented substantially parallel to the work surface.

34. A method of operating on a work surface, the method comprising:
   (a) obtaining a tool adapted to act on a work surface, the tool including:
      a tool portion, and
      a light generating device portion comprising:
         a self-leveling pendulum assembly including a pendulum pendulously suspended within the light generating device;
         a light source fixed to the pendulum, wherein the light source is operable to direct light along a first pathway,
         a light redirection assembly capable of moving from a first position to a second position to selectively redirect the light from the first pathway to a second pathway,
         a lock mechanism operable to secure the pendulum and prevent its pivotal motion, and
         an actuator operable to selectively engage and disengage the lock mechanism and to selectively activate and deactivate the light source;
   (b) engaging the work surface with the light generating device portion of the tool;
   (c) orienting the redirection assembly in the first position; and
   (d) activating the light source to direct the light beam along the first pathway toward the light redirection assembly and to generate a light line on the work surface in a first direction.

35. The method of claim 34 further comprising (e) engaging the work surface with the tool portion.

36. The method of claim 35, wherein (e) comprises:
   (e.1) manually marking the work surface proximate the light line to create a reference line; and
   (e.2) engaging the reference line with the tool portion.

37. The method of claim 36, further comprising:
   (f) orienting the redirection assembly in the second position to cause the light beam to generate a light line on the work surface in a second direction.

38. The method of claim 34, wherein:
   the tool portion comprises a drill; and
   (e) comprises (e.1) drilling a hole into the work surface.

39. A tool adapted to act on a work surface comprising:
   a tool portion; and
   a light generating device portion comprising:
      a light source, wherein the light source generates light directed along a first pathway; and
      a light redirection assembly comprising a first mirror angularly spaced from a second mirror, wherein:
         the light redirection assembly is capable of moving from a first position to a second position to selectively redirect the light from the first pathway to a second pathway,
         in the first redirection assembly position, the first mirror is oriented in the pathway of the light generated by the light source to redirect the light from the first pathway to the second pathway, and
         in the second redirection assembly position, the second mirror is oriented in the pathway of the light generated by the light source.

40. The tool of claim 39, wherein the tool portion comprises a power drill.

41. The tool of claim 39, wherein:
   the light generating device further comprises a self-leveling pendulum assembly including a pendulum pendulously suspended within the light generating device; and
   the light source is fixed to the pendulum.

42. The tool of claim 39, wherein:
   the light generating device generates a light line on the work surface; and
   movement of the redirection assembly from the first position to the second position alters the position of the light line generated on the work surface.

43. A tool adapted to act on a work surface comprising:
   a tool portion; and
   a light generating device portion comprising:
      a light source, wherein the light source generates light directed along a first pathway; and
      a light redirection assembly comprising a first mirror angularly spaced from a second mirror, wherein:
         the light redirection assembly is capable of moving from a first position to a second position to selectively redirect the light from the first pathway to a second pathway,
         in the first redirection assembly position, either the first or second mirror is oriented in the pathway of the light generated by the light source to redirect the light from the first pathway to the second pathway, and
         in the second redirection assembly position, neither the first nor the second mirror is oriented in the pathway of the light generated by the light source.

44. The tool of claim 43, wherein the tool portion comprises a power drill.

45. The tool of claim 43, wherein:
   the light generating device further comprises a self-leveling pendulum assembly including a pendulum pendulously suspended within the light generating device; and
   the light source is fixed to the pendulum.

46. The tool of claim 43, wherein:
   the light generating device generates a light line on the work surface; and
   movement of the redirection assembly from the first position to the second position alters the position of the light line generated on the work surface.

47. A tool operable to act on a work surface comprising:
   a tool portion; and
   a light line generating device comprising:
      a housing including a first window, a second window, and a third window;
      a self-leveling pendulum assembly disposed within the housing including:
         a pendulum, and
         a light source operable to create a light line on a work surface, wherein the light source emits a light beam traveling in a first direction; and
      a redirection assembly disposed within the housing,
   wherein the redirection assembly is movable from a first position, in which the assembly permits the light beam to continue traveling in the first direction, to a second position, in which the assembly redirects the light beam from the first direction to a second direction, and to a third position, in which the assembly redirects the light beam from the first direction to a third direction, and wherein:

in the first direction, the light beam is directed out of the first window, in the second direction, the light beam is directed out of the second window, and in the third direction, the light beam is directed through the third window.

48. A tool operable to act on a work surface comprising:
a tool portion; and
a light line generating device comprising:
  a housing;
  a self-leveling pendulum assembly disposed within the housing including:
    a pendulum, and
    a light source operable to create a light line on a work surface, wherein the light source emits a light beam traveling in a first direction; and
  a redirection assembly disposed within the housing,
wherein the redirection assembly is movable from a first position, in which the assembly permits the light beam to continue traveling in the first direction, to a second position, in which the assembly redirects the light beam from the first direction to a second direction, and wherein the redirection assembly is further movable to a third position, in which the redirection assembly redirects the light beam from the first direction to a third direction.

49. The tool of claim 48, wherein:
the housing includes a first window, a second window, and a third window;
in the first direction, the light beam is directed out of the first window;
in the second direction, the light beam is directed out of the second window; and
in the third direction, the light beam is directed through the third window.

50. The tool of claim 48, wherein redirection assembly comprises a mirror assembly including a first mirror and a second mirror.

* * * * *